United States Patent [19]

Dieck et al.

[11] 4,083,820

[45] Apr. 11, 1978

[54] LOW SMOKE POLYPHOSPHAZENE COMPOSITIONS

[75] Inventors: Ronald L. Dieck; Edwin J. Quinn, both of Lancaster, Pa.

[73] Assignee: Armstrong Cork Company, Lancaster, Pa.

[21] Appl. No.: 798,818

[22] Filed: May 20, 1977

[51] Int. Cl.[2] .............................................. C08J 9/00
[52] U.S. Cl. ......................... 260/2.5 FP; 260/2.5 R; 260/37 R
[58] Field of Search ............ 260/37 R, 2.5 R, 2.5 FP

[56] References Cited

U.S. PATENT DOCUMENTS

| | | | |
|---|---|---|---|
| 3,994,838 | 11/1976 | Thompson et al. | 260/2.5 FP X |
| 4,026,838 | 5/1977 | Dieck et al. | 260/2.5 FP |
| 4,026,839 | 5/1977 | Dieck et al. | 260/2.5 FP |

Primary Examiner—Lewis T. Jacobs
Attorney, Agent, or Firm—Richard J. Hammond

[57] ABSTRACT

Smoke-suppressant additives for polyphosphazene homopolymers, copolymers and foams thereof are described. Smoke suppression occurs by the incorporation of an effective amount of organo titanate-treated mineral filler.

40 Claims, No Drawings

LOW SMOKE POLYPHOSPHAZENE COMPOSITIONS

BACKGROUND OF THE INVENTION

Field of the Invention

This invention relates to polyphosphazene homopolymeric and copolymeric compositions, to flexible and semirigid foams produced from said homopolymeric and copolymeric compositions, and to a process for preparing these materials. These compositions exhibit excellent smoke-suppressant properties as a result of having incorporated therein an effective amount of an organo titanate-treated mineral filler. Foams prepared from the compositions produce low smoke levels, or essentially no smoke, when heated in an open flame. All of the homopolymeric and copolymeric compositions described may be crosslinked at moderate temperatures in the presence of free radical initiators, and the copolymers containing reactive unsaturation additionally may be cured by conventionall sulfur-curing or vulcanizing additives to modify their properties and expand their field of use.

2. Description of the Prior Art

The preparation of poly(aryloxyphosphazene) polymers has been disclosed in U.s. Pat. No. 3,856,712 to Reynard et al; U.S. Pat. No. 3,856,713 to Rose et al; and U.S. Pat. No. 3,883,451 to Reynard et al. The copolymers described in the first-mentioned Reynard et al patent contain selected quantities of both alkoxy and aryloxy side chains in the copolymer backbone, whereas the copolymers described in the latter-mentioneed Reynard et al patent are characterized by the presence of halogen-substituted aryl side chains in the copolymer backbone. Other related art may be found in U.S. Pat. Nos. 3,515,688; 3,700,629; 3,702,833; 3,856,712; and Ser. No. 661,862 filed Feb. 27, 1976.

It is generally recognized that these prior art phosphazene polymers are low-temperature elastomeric or film-forming plastics. Depending on the nature of the substituent on the phosphorous-nitrogen backbone, impressive hydrolytic and chemical stability has been found to be associated with these polymers.

However, many of these prior art homopolymers and copolymers are noted for their high smoke-forming properties which severly limit their rangee of application. Recently, smoke-suppressant additives for poly(aryloxyphosphazenes) have been disclosed that are normally solid carboxylic acids. See copending Application Ser. No. 712,149, filed Aug. 6, 1976.

SUMMARY OF THE INVENTION

It is an object of the present invention to provide low smoke-generating compositions comprising phosphazene homopolymers and copolymers containing an effective amount of a smoke-suppressing, organo titanate-treated mineral filler.

It is a further object of the present invention to provide low smoke-generating compositions comprising phoshazene homopolymeric or copolymeric foams containing an effective amount of smoke-suppressing, organo titanate-treated mineral filler.

These and other objects of the present invention will become more apparent to those skilled in the art upon reading the more detailed description set forth hereinbelow.

DESCRIPTION OF THE PREFERRED EMBODIMENTS

The organo titanate materials used to treat mineral fillers that are then incorporated into phosphazene polymers comprise those of the formula:

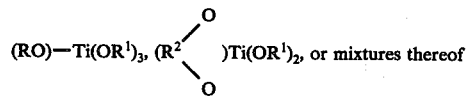

wherein $R^1$ is the radical $-C(O)R^3$, $-P(O)(OR^4)_2$, $-P(OR^5)_2$, or $-P(O)(OH)OP(OR^6)_2$; R, $R^2$, $R^3$, $R^4$, $R^5$, and $R^6$ are the same or different and are $C_1$ to $C_{18}$ linear or branched alkyl, $C_2$ to $C_{18}$ linear, branched, or cycloalkylenyl, oxo-substituted $C_2$ to $C_{18}$ linear, branched, or cycloalkylenyl, $C_2$ to $C_{18}$ linear or branched alkenyl, $C_6$ to $C_{14}$ aryl or $C_6$ to $C_{14}$ substituted aryl the substituents $C_1$ to $C_{18}$ linear or branched alkyl, $C_2$ to $C_{18}$ linear or branched alkenyl, halo, amino, $C_1$ to $C_8$ alkylamino or $C_1$ to $C_8$ dialkylamino. Preferably R is different than $R^2$, $R^3$, $R^4$, $R^5$, and $R^6$ and is $C_1$ to $C_8$ linear or branched alkyl, $C_2$ to $C_8$ linear, branched, or cycloalkylenyl or oxo-substituted $C_2$ to $C_8$ linear, branched, or cycloalkylenyl; $R^2$, $R^3$, $R^4$, $R^5$, and $R^6$ are the same or different and are $C_8$ to $C_{18}$ linear or branched alkyl, $C_8$ to $C_{18}$ linear, branched, or cycloalkylenyl, $C_8$ to $C_{18}$ linear or branched alkenyl, $C_6$ to $C_{14}$ substituted aryl, the substituents $C_8$ to $C_{18}$ linear or branched alkyl, $C_8$ to $C_{18}$ linear or branched alkenyl, chloro, $C_1$ to $C_4$ alkylamino or $C_1$ to $C_4$ dialkylamino; and $R^1$ is $-C(O)R^3$ or $-P(O)(OH)OP(OR^6)_2$. Illustrative titanates of use in the treated-mineral filler phosphazenes are:

isopropyl triisostearoyl titanate;
isopropyl tristearoyl titanate;
isopropyl tridodecylbenzenesulfonyl titanate;
isopropyl tri(dioctylphosphato)titanate;
isopropyl tri(lauryl-myristyl)titanate;
isopropyl di(lauryl-myristyl)methacryl titanate;
isopropyl lauryl-myristyl dimethacryl titanate;
isopropyl triricinoyl titanate;
isopropyl distearoyl methacryl titanate;
isopropyl dimethacryl isostearoyl titanate;
isopropyl trimethacryl titanate;
isopropyl diisostearoyl acryl titanate;
isopropyl isostearoyl diacryl titanate;
isopropyl triacryl titanate;
isopropyl di(4-aminobenzoyl) isostearoyl titanate;
isopropyl trianthranil titanate;
isopropyl diisostearoyl cumylphenyl titanate;
isopropyl tri-cumylphenyl titanate;
isopropyl tri(methoxyphenyl) titanate;
isopropyl di(2-formylphenyl) isostearoyl titanate;
isopropyl tri(2-formylphenyl) titanate;
isopropyl tri(N,N-dimethyl-ethylamino) titanate;
isopropyl tri (N ethylamino-ethylamino) titanate;
isopropyl tri (dioctylpyrophosphato) titanate;
tetraisopropyl di(dilaurylphosphito) titanate;
tetraisopropyl di(dioctylphosphito) titanate;
tetraoctyloxytitanium di(dilaurylphosphite);
tetra (2,2diallyloxymethyl-1-buteneoxy titanium di (di-tridecyl) phosphite;
titanium diisostearate oxyacetate;
titanium di(dioctylphosphate) oxyacetate;
titanium di(dioctylpyrophosphate) oxyacetate;
titanium isostearate methacrylate oxyacetate;
titanium dimethacrylate oxyacetate;

titanium acrylate isostearate oxyacetate;
titanium diacrylate oxyacetate;
titanium 4-aminobenzenesulfonate dodecylbenezenesulfonate oxyacetate;
titanium 4-aminobenzoate isostearate oxyacetate;
titanium di(cumylphenolate) oxyacetate;
di (12-formylphenoxyl)titanium oxyacetate;
titanium dianthranilate oxyacetate;
diisostearoyl ethylene titanate;
di(dioctylphosphato)ethylene titanate;
di(dioctylpyrophosphato)ethylene titanate;
ethylene methacryl isostearoyl titanate;
dimethacryl ethylene titanate;
diacryl ethylene titanate;
4-aminobenzoyl ethylene isostearoyl titanate;
dianthranil ethylene titanate;
di-cumylphenoxy ethylene isostearoyl; and
di-(2-formylphenyl) ethylene titanate.

The mineral fillers of preference herein are those of a nonfibrous nature such as aluminum oxide, limestone, whiting, clay, talc, silica, pumice, wood floor, and mixtures thereof. While fibrous mineral fillers, such as asbestos, glass wool, mineral wool, and the like, are within the scope of the present invention, such do not represent highly desirable fillers because of various health considerations. Therefore, in the preparation of the compositions of the various embodiments herein, filler mixtures of reduced fiber content are preferred. Non-fibrous type filler compositions are particularly useful and alumina trihydrate and limestone represent the most preferred fillers. While the particle size of such fillers can vary from those very coarse to very fine particles, such having average particle sizes ranging from about 0.5. to about 400 microns, the preferable particle size is from about 0.5 microns to about 20 microns. The amount of filler to be blended with the surface treating titanate described above can vary widely, but economics normally dictates that the filler be treated by 0.1% to 10% by weight based on filler of the above described titanates. Preferably 0.2% to 5%, most preferably 0.5% to 2% by weight of titanate compound is used to treat the mineral fillers.

Blending the mineral filler with the organo titanate-treating agents can be accomplished by a wide variety of techniques well known in the prior art. Thus, the titanium compound and mineral filler can be blended in a low intensity mixer such as a Baker Perkins mixer to cause effective and uniform distribution of the treating agent over the entire change of filler. High intensity mixing also produces satisfactory blending, e.g. with Henschel mixers.

The titanate-treated mineral fillers set forth above have been found to be useful in a variety of prior art phosphazene polymers. These phosphazene polymers are represented by the repeating units of the following formula:

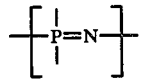

in which various groups are attached to the phosphorous atom through carbon, oxygen, nitrogen, and the like; such groups including alkoxy, aryloxy, alkyl, aryl, amino, alkylamino, arylamino, etc. See Allcock, Phosphorous-Nitrogen Compounds, Academic Press, N.Y. 1972. The phosphazene polymers described in the prior art are of the structure

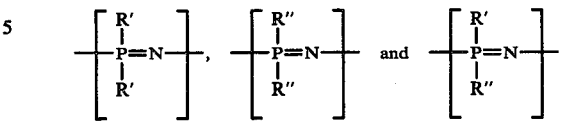

where R' and R" can be the same or different and are halogen, amino, $C_1$ to $C_{10}$ dialkylamino, $C_1$ to $C_{10}$ alkylamino, $C_6$ to $C_{14}$ arylamino, $C_6$ to $C_{14}$ diarylamino, $C_1$ to $C_{18}$ linear or branched alkyl, $C_2$ to $C_{18}$ linear or branched alkenyl, $C_1$ to $C_{18}$ alkoxy, $C_6$ to $C_{14}$ aryl, $C_6$ to $C_{14}$ aryloxy, substituted $C_1$ to $C_{18}$ linear or branched alkyl, substituted $C_2$ to $C_{18}$ linear or branched alkenyl, substituted $C_1$ to $C_{18}$ alkoxy, substituted $C_6$ to $C_{14}$ aryl, substituted $C_6$ to $C_{14}$ aryloxy, the substituents being selected from the group consisting of halogen, nitro, cyano, alkoxy, aryloxy, amino, $C_1$ to $C_{10}$ alkylamino, $C_1$ to $C_{10}$ dialkylamino, $C_6$ to $C_{14}$ arylamino, or $C_6$ to $C_{14}$ diarylamino.

The preferred polymers of use herein are those homopolymers of aryloxy and alkoxy phosphazenes as set forth in U.S. Pat. No. 3,370,020 or U.S. Pat. No. 3,853,794; as well as those copolymers of aryloxy and alkoxyphosphazenes as set forth in U.S. Pat. Nos. 3,856,712; 3,856,713; 3,883,451; 3,948,820; and copending Application Ser. No. 661,862 filed Feb. 27, 1976, incorporated herein by reference.

The most preferred polyphosphazene polymers used in the compositions of this invention comprise randomly repeating aryloxy units represented by the formulas

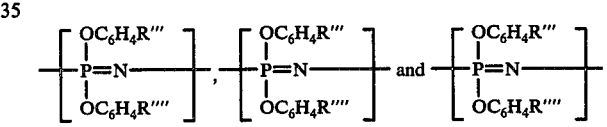

wherein R''' and R'''' are the same of different and are $C_1$ to $C_{10}$ linear or branched alkyl, substituted $C_1$ to $C_{10}$ linear or branched alkyl, $C_1$ to $C_{10}$ alkoxy, substituted alkoxy, arylalkyl, $C_6$ to $C_{14}$ aryl or substituted $C_6$ to $C_{14}$ aryl. The substituents R''' and R'''' are illustrated by the groups ethyl, propyl, isopropyl, butyl, isobutyl, amyl, isoamyl, hexyl, octyl, decyl, and the like. Other examples of R''' and R'''' include ethoxy, methoxy, isopropoxy, N-butoxy, methyl, tertiary butyl, tertiary pentyl, 2ethylhexyl, n-nonyl, dimethylamino, chloro, bromo, fluoro, naphthyl and cresyl. Where R''' and R'''' are substituted $C_1$ to $C_{10}$ linear or branched alkyl or $C_1$ to $C_{10}$ linear or branched alkoxy, the substituents are illustrated by chloro, bromo, cyano, nitro, methoxy, ethoxy, propoxy, amino, dimethylamino, methylamino, and the like.

It is to be understood, in this most preferred embodiment, that when R''' is the same as R'''', homopolymers are formed. When R''' and R'''' are substituted phenyl, it is presently preferred that all R'''s are the same as all R''''s. However, in substituted phenyl, the R'''s can be mixed and the R''''s can be mixed. The mixtures may be mixtures of different alkyl radicals or mixtures of different ortho, meta and para isomers. One skilled in the art readily will recognize that steric hindrance will dictate the propriety of using relatively bulky groups in the para position on the aryloxy ring since, as set forth hereinafter, the polymers are made by reacting a substituted metal oxide with the chlorine atom on the phosphorus atom of hexachlorocyclotriphosphazene. Desirably, groups which sterically inhibit this reaction should be avoided. Absent the foregoing proviso, selection of various R'''s and R''''s, in the case of phenyl substituents, will be apparent to anyone skilled in the art based upon this disclosure.

For the sake of simplicity, the most preferred polymers used to prepare the titanate-treated compositions in accordance with the present invention, containing the repeating units disclosed above, may be represented by the formula $[NP(OC_6H_4R''')_a(OC_6H_4R'''')_b]_n$ wherein n is from about 20 to about 2,000 or more, and wherein a and b are greater than 0, and $a + b = 2$. It should be understood that, in the case of homopolymers, $R''' = R''''$ and $a = b = 2$.

The most preferred polymers used to prepare the compositions of this invention may contain small amounts of randomly distributed repeating units in addition to the repeating units described above. Examples of these additional repeating units are:

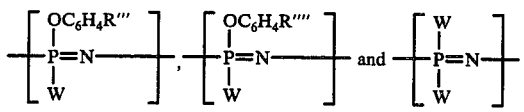

wherein W represents a group capable of a crosslinking chemical reaction, such as aliphatic unsaturation on an aromatic ring or olefinic unsaturation, preferably ethylenic unsaturation. Such group is capable of further reaction at relatively moderate temperatures. In copolymers containing W, the ratio of $W:[(OC_6H_4R''') + (OC_6H_4R'''')]$ is less than about 1:5. For the sake of simplicity, the copolymers which are further reactive may be represented by the formula $[NP(OC_6H_4R''')_a(OC_6H_4R'''')_b(W)_c]_n$, wherein W, R''', R'''', n, a, and b are as set forth above and wherein $a + b + c = 2$. Examples of W are $-C_6H_4CH_2CH=CH_2$, $C_6H_3-2-OCH_3-4-CH_2CH=CH_2$, $CH_2CH=CH_2$, $OR_2CH_2CH=CH_2$; $OC(R_4)=CH_2$; $OR_3CF=CF_2$, and similar groups which contain unsaturation, wherein $R_2$ and $R_4$ are the same or different and are any acryl, aliphatic, or aromatic radical, especially $-CH_2-$. These groups are capable of further reaction at moderate temperatures (for example, 250°–350° F.) by free radical processes utilizing various free radical sources. Conventional sulfur-curing or vulcanizing additives known in the rubber art or other reagents, often even in the absence of accelerators, using conventional amounts, techniques, and processing equipment are also useful in achieving further reaction in copolymers containing the group W.

The above-described phosphazene polymers, preferred phosphazene polymers and most preferred phosphazene polymers, including those containing reactive sites designated as W below, may be crosslinked and/or cured at moderate temperatures (for example, 200°–350° F.) by the use of free radical initiators, for example peroxides, using conventional amounts, techniques and processing equipment.

Examples of free radical initiators include benzoyl peroxide, bis(2,4-dichlorobenzoyl peroxide), di-tert-butyl peroxide, dicumyl peroxide, 2,5-dimethyl(2,5-di-tert-butylperoxy)hexane, t-butyl perbenzoate, 2,5-dimethyl-2,5-di(tert-butyl peroxy) hepyne-3, and 1,1-bis(tert-butylperoxy)-3,3,5-trimethylcyclohexane.

Thus, the general peroxide classes which may be used for crosslinking include diacyl peroxides, peroxyesters, and dialkyl peroxides.

Examples of sulfur-type curing systems include vulcanizing agents such as sulfur; sulfur monochloride; selenium, tellurium, and thiuram disulfides; p-quinone dioximes; polysulfide polymers; and alkyl phenol sulfides. The above vulcanizing agents may be used in conjunction with accelerators, such as aldehyde amines, thiocarbamates, thiuram sulfides, guanidines, and thiazols, and accelerator activators, such as zinc oxide or fatty acids, e.g., stearic acid.

It is also possible to use as W in the above formulas monovalent radicals represented by the formulas (1) $-OSi(OR_4)_2R_5$ and other similar radicals which contain one or more reactive groups attached to silicon; (2) $-OR_6NR_6H$ and other radicals which contain reactive $-NH$ linkages. In these radicals $R_4$, $R_5$ and $R_6$ each represent aliphatic, aromatic and acyl radicals. Like the groups above, these groups are capable of further reaction at moderate temperatures in the presence of compounds which effect crosslinking. The presence of a catalyst to achieve a cure is often desirable. The introduction of groups such as W into polyphosphazene polymers is shown in U.S. Pat. Nos. 3,888,799; 3,702,833 and 3,844,983, which are hereby incorporated by reference.

Where R''' and R'''' are different, the ratio of $a:b$, and of $(a+b):c$ where units containing W are present in the copolymer, affects the processability, smoke production, glass transition temperature and a number of other properties of the compositions of this invention. These ratios also affect the ability to be foamed and the properties, such as the rigidity, or the resulting foams. For example, it has been found that an increase in the mole percent of R'''' as alkoxy when R''' is alkyl decreases the amount of smoke generated when these copolymers are subjected to an open flame. It has been found, also, that as the mole percent of R''' as alkoxy when R'''' is alkyl approaches 100 percent, the crystallinity of the copolymers increases and their ability to be foamed diminishes. Similarly, it has been found that when the mole percent of W increases, the degree of crosslinking increases and the ability to be foamed diminishes. Accordingly, it is contemplated that alkoxy-containing copolymeric compositions of this invention, e.g. where R''' is alkoxy and R''' R'''' contain a mole ratio of $a:b$ of at least about 1:6 and up to about 6:1, and preferably between about 1:4 and 4:1. It is also contemplated that the mole ratio of $c:(a+b)$ will be less than about 1:5, preferably from about 1:50 to about 1:10. When R''' and R'''' are the same, $a=b$ and $c:2a$ (or $c:2b$) is from about 1:50 to about 1:10.

The novel compositions of this invention are very thermally stable. The mixtures are soluble in specific organic solvents such as tetrahydrofuran, benzene, xylene, toluene, dimethylformamide and the like, and can be formed into films from solutions of the copolymers by evaporation of the solvent. The polymers are water resistant at room temperature and do not undergo hydrolysis at high temperatures. The polymers may be used to prepare films, fibers, coatings, molding compositions and the like. They may be additionally blended with such additives as antioxidants, ultraviolet light absorbers, lubricants, plasticizers, dyes, pigments, and other resins, etc., without detracting from the scope of the present invention.

The polymers may be used to prepare foamed products which produce low smoke levels, or essentially no smoke when heated in an open flame. The foamed products may be prepared from filled or unfilled formulations using conventional foam techniques with chemical blowing agents, i.e. chemical compounds stable at original room temperature which decompose or interact at elevated temperatures to provide a cellular foam. Suitable chemical blowing agents include:

| Blowing Agent | Effective Temperature Range ° C. |
|---|---|
| Azobisisobutyronitrile | 105–120 |
| Azo dicarbonamide (1,1-azobisformamide) | 100–200 |
| Benzenesulfonyl hydrazide | 95–100 |
| N,N'-dinitroso-N,N'-dimethyl terephthalamide | 100 |
| Dinitrosopentamethylenetetramine | 130–150 |
| Ammonium carbonate | 58 |
| p,p'-oxybis-(benzenesulfonylhydrazide) | 100–200 |
| Diazo aminobenzene | 84 |
| Urea-biuret mixture | 90–140 |
| 2,2'-azo-isobutyronitrile | 90–140 |
| Azo hexahydrobenzonitrile | 90–140 |
| Diisobutylene | 103 |
| 4,4'-diphenyl disulfonylazide | 110–130 |

Typical peroxide-curable foam formulations include:

| | |
|---|---|
| Phosphazene copolymer e.g., $[NP(OC_6H_5)(OC_6H_4\text{-}p\text{-}OCH_3)]_n$ | 100 parts |
| Filler | Varied |
| Stabilizer (e.g., magnesium oxide) | 2.5–10 phr |
| Processing aid (.e.g, zinc stearate) | 2.5–10 phr |
| Plasticizer resin (e.g., Cumar P-10, coumarone indene resin) | 2.5–10 phr |
| Blowing agent (e.g., 1,1'-azobisformamide) | 10–50 phr |
| Activator (e.g., oil-treated urea) | 10–40 phr |
| Peroxide curing agent (e.g., 2,5-dimethyl-2,5-di(t-butylperoxy)hexane) | 2.5–10 phr |
| Peroxide curing agent (e.g., benzoyl peroxide) | 2.5–10 phr |
| Peroxide curing agent (e.g., dicumyl peroxide) | 10 phr |

Typical sulfur-curable foam formulations include:

| | | |
|---|---|---|
| Phosphazene polymer | 100 | parts |
| Filler (e.g., treated or untreated alumina trihydrate) | 0–250 | phr |
| Stabilizer (e.g., magnesium oxide) | 0–10 | phr |
| Processing aid (e.g., zinc stearate) | 2–20 | phr |
| Blowing agent (e.g., 1,1'-azobisformamide) | 10–50 | phr |
| Activator (e.g., oil-treated urea) | 2–20 | phr |
| Vulcanizer (sulfur) | 0.5–5 | phr |
| Pigment (TiO$_2$) | 0–10 | phr |
| Accelerators | | |
| (e.g., zinc dimethyldithiocarbamate) | 0.4–5 | phr |
| (e.g., tellurium diethyldithiocarbamate) | 0.2–2 | phr |
| (e.g., N,N'dibutylthiourea) | 0.22 | phr |

While the above are preferred formulation guidelines, obviously some or all of the adjuvants may be omitted, replaced by other functionally equivalent materials, or the proportions varied, within the skill of the art of the foam formulator.

In one suitable process, the foamable ingredients are blended together to form a homogeneous mass; for example, a homogeneous film or sheet can be formed on a 2-roller mill, preferably with one roll at ambient temperature and the other at moderately elevated temperature, for example 100°–120° F. The homogeneous foamable mass can then be heated to provide a foamed structure; for example, by using a mixture of a curing agent having a relatively low initiating temperature, such as benzoyl peroxide, and a curing agent having a relatively high initiating temperature, such as 2,5-dimethyl-2,5-di(t-butylperoxy) hexane, and partially precuring in a closed mold for about 6–30 minutes at 200°–250° F. followed by free expansion for 30–60 minutes at 300°–350° F. In the alternative, the foaming may be accomplished by heating the foamable mass for 30–60 minutes at 300°–350° F. using a high temperature or low temperature curing agent, either singly or in combination. One benefit of utilizing the "partial precure" foaming technique is that an increase in the molecular weight of the foamable polymer prior to the foaming step enables better control of pore size and pore uniformity in the foaming step. The extent of "precure" desired is dependent upon the ultimate foam characteristics desired. The desired foaming temperature is dependent on the nature of the blowing agent and the crosslinkers present. The time of heating is dependent on the size and shape of the mass being foamed. The resultant foams are generally light tan to yellowish in appearance, and vary from flexible to semirigid, depending upon the glass transition temperature of the copolymer employed in the foam formulation, that is to say, the lower the glass transition of the polymer, the more flexible will be the foam produced therefrom.

Also, as mentioned above, the polymers of this invention can be crosslinked at moderate temperatures by conventional free radical and/or sulfur-curing techniques when minor amounts of unsaturated groups W are present in the polymer backbone. The ability of these polymers to be cured at temperatures below about 350° F. makes them particularly useful as potting and encapsulation compounds, sealants, coatings and the like. These polymers are also useful for preparing crosslinked foams which exhibit significantly increased tensile strengths over uncured foams. These polymers are often crosslinked in the presence of inert, reinforcing or other fillers and the presence of these and other conventional additives are deemed to be within the scope of this invention.

Titanate-treated, mineral filled polyphosphazenes are surprisingly advantageous over the non-treated materials. Mixes are more easily processed, requiring less time and energy to form homogeneous sheets. The sheets are smoother and display properties that suggest them to be lightly plasticized in comparison to dry and stiff sheets with untreated filler. Generally 5 parts by weight to 400 parts by weight based on 100 parts of polyphosphazene of treated filler is blended by any of the well recognized polymer blending methods of the prior art, e.g. low intensity mixing such as with a Twin-Shell mixer or high intensity mixing, e.g. Ko-Kneader. Preferably from about 10 parts by weight to about 200 parts by weight based on 100 parts of polyphosphazene of the titanate treated fillers are incorporated in the compositions of the present invention, most preferably 100 to 200 parts per 100 parts. In foam formulations the same advantages accrue, but in addition, the titanate coupling agent also acts upon the chemical blowing agent to increase the gas evolution. Thus, foams are formed having lower densities, smaller and more uniform pores or cells. Further, there is no change in the flammability properties while smoke evolution from the foams is considerably reduced.

The following examples are set forth for purposes of illustration only and are not to be construed as limitations of the present invention except as set forth in the appended claims. All parts and percentages are by weight unless otherwise indicated.

EXAMPLE 1

Preparation of $-(-NPCl_2-)_n$ 250 parts of phosphonitrilic chloride trimer, previously recrystallized from n-heptane, were degassed and sealed in a suitable, thick-walled reaction vessel at $10^{-2}$ Torr and heated to 250° C. for 6 hours. Polymerization was terminated at this time since a glass ball, one-half inch in diameter ceased to flow due to the increased viscosity of the molten mass, when the vessel was inverted. Termination was effected by cooling the vessel to room temperature. The resulting polymeric mixture was then dissolved in toluene to form an anhydrous solution.

General Preparative Procedure for Treating Mineral Filler With Titanate Treating Agents Mineral filler is charged into a steamheated Baker-Perkins mixer. The required amount of titanate coupling agent is next added and the mixture blended until the mix temperature has reached 300° F. (approximately 20 to 30 minutes). The resultant mix is then discharged and allowed to cool before use.

99.5 parts by weight of alumina trihydrate (Hydral-710) particle size ½ to 8 microns was mixed as shown above with 0.5 parts of di(dioctylpyrophosphato) ethylene titanate coupling agent to form a titanate-treated alumina containing ½ percent of the organo titanate.

The following Masterbatch formulation was employed, utilizing the above treated alumina trihydrate in the preparation of low-smoke polyphosphazene foams using a peroxide-curing system in accordance with the present invention.

| Peroxide-Cure Masterbatch | Parts by Weight |
|---|---|
| Cup A Polyphosphazene | 100 |
| Cup B* 1,1'azobisformamide | 20 |
| oil-treated urea (activator) | 5 |
| magnesium oxide | 5 |
| zinc stearate | 10 |
| cumarone indene resin (Cumar P10) | 2 |
| 2,5-dimethyl-2,5-(di-t-butyl peroxy)hexane | 6 |
| benzoyl peroxide (78% active) | 2 |
| dicumyl peroxide | 1 |
| mineral filler - alumina trihydrate, titanate-treated | Varied |

*Parts per hundred parts of polyphosphazene (phr)

The polyphosphazene was placed on a two-roll mill with one roll at 120°–140° F. and the other at ambient conditions. The ingredients in Cup B were added to the polymer on the mill. This was allowed to mix for an additional 15 minutes. The unexpanded blend was then precured in a press for one minute at a temperature of 200° F. and a pressure of 2000 psi. Pad thickness after pressing was ⅛ inch. Finally, the precured pad was free expanded in a circulating air oven for 30 minutes at 300° F.

Comparative

Using the formulation and method described above 100 parts of $[NP(OC_6H_4-4-OCH_3)(OC_6H_4-4-secC_4H_9)]_n$ were mixed with 100 parts of untreated alumina trihydrate, the ingredients were blended and foamed. The resulting foam was soft, yellow-beige, fairly flexible foam, density 13.2 pounds per cubic foot. Similar comparative formulatins were made with 150 parts of untreated alumina trihydrate and with 200 parts of untreated alumina trihydrate. These foams and foam prepared in accordance with the present invention are illustrated in the following table.

Table I

Examples 2 – 18

| | Filler[1] | | Foam Properties | | | | | | |
|---|---|---|---|---|---|---|---|---|---|
| | | Titanate | Density | | Flaming | | Nonflaming[4] | | $\frac{F + N[5]}{2}$ |
| Example | Parts | Treating Agent[2] | lbs/ft.[3] | OI[3] | Dm | SV/g | Dm | SV/g | Avg. |
| Comparative | 100 | None | 13.2 | 38.1 | 267 | 34 | — | — | — |
| Comparative | 150 | None | 13.4 | — | 131 | 15 | — | — | — |
| Comparative | 200 | None | 22.8 | — | 124 | 9 | — | — | — |
| 2 | 100 | 0.1% ETDOPP | 16.8 | 38.0 | 221 | 23 | — | — | — |
| 3 | 100 | 0.5% ETDOPP | 11.1 | 37.9 | 177 | 26 | — | — | — |
| 4 | 150 | " | 13.2 | — | 121 | 14 | — | — | — |
| 5 | 200 | " | 18.7 | — | 100 | 9 | — | — | — |
| 6 | 100 | 1% ETDOPP | 9.5 | 37.5 | 138 | 22 | 117 | 18 | 128 |
| 7 | 100 | 6% ETDOPP | 11.0 | 38.0 | 260 | 32 | — | — | — |
| 8 | 100 | 5% ETDOPP | 13.3 | 38.1 | 274 | 32 | — | — | — |
| 9 | 100 | 0.5% GTDOPP | 11.3 | 37.5 | 201 | 29 | — | — | — |
| 10 | 100 | 0.5% TTOPP | 13.3 | — | 165 | 21 | — | — | — |
| 11 | 100 | 0.5% TTOPP-IL | 13.1 | 37.8 | 189 | 27 | — | — | — |
| 12 | 100 | 0.5% TTS | 9.4 | — | 186 | 28 | 108 | 17 | 147 |
| 13 | 100 | 1% TTS | 7.7 | 37.8 | 133 | 24 | 111 | 20 | 122 |
| 14 | 100 | 2% TTS | 10.5 | 37.9 | 306 | 45 | 153 | 23 | 230 |
| 15 Comparative | 100 | 0.5% TB2NS | 17.6 | — | 377 | 33 | — | — | — |
| 16 Comparative | 100 | 0.5% TTBS | 15.9 | — | 342 | 34 | — | — | — |
| 17 | 100 | 0.5% TTMDTP | 8.9 | — | 229 | 36 | — | — | — |

Table I-continued

| | Filler[1] | | Examples 2 – 18 Foam Properties | | | | | | |
|---|---|---|---|---|---|---|---|---|---|
| | | Titanate | Density | | Flaming | | Nonflaming[4] | | $\frac{F + N}{2}$[5] |
| Example | Parts | Treating Agent[2] | lbs/ft.$^3$ | OI[3] | Dm | SV/g | Dm | SV/g | Avg. |
| 18 | 100[6] | 0.5% ETDOPP | 12.6 | 36.6 | 299 | 37 | — | — | — |

[1] Alumina trihydrate treated with the titanate treating agent as shown above,
[2] Titanate treating agents % by weight based on mineral filler
ETDOPP di(dioctyl pyrophosphato) ethylene titanate;
GTDOPP titanium di(dioctyl pyrophosphato) oxyacetate;
TTOPP isopropyl tri(dioctyl pyrophosphato) titanate;
TTOPP-IL isopropyl tri(dioctyl phosphate) titanate;
TTS isopropyl tri(isostearyl) titanate;
TB2NS isopropyl 4-aminobenzene sulfonyl di(dodecyl benzene sulfonyl) titanate;
TTBS isopropyl tri(dodecyl benzene sulfonyl) titanate; and
TTMDTP tetra (2,2-diallyloxymethyl-1-butenoxy titanium di(di-tridecyl) phosphite. Kenrich Petrochemicals, Inc., Bayonne, NJ.
[3] Oxygen Index by ASTM D-2863-74
[4] Flaming and Nonflaming Mode by ASTM STP-442(1967).
[5] Flaming/Nonflaming Mode Averages
[6] Alumina trihydrate replaced by calcium carbonate (44 micron particle size)

The following Masterbatch formulation was employed in the preparation of low-smoke polyphosphazene foams containing titanate-treated alumina trihydrate using a sulfur-type curing system:

Sulfur-Cure Masterbatch

| | | Parts by Weight |
|---|---|---|
| Cup A | Polyphosphazene | 100 |
| Cup B* | 1,1'azobisformamide | 20 |
| | oil-treated urea | 5 |
| | zinc stearate | 10 |
| | magnesium oxide dispersion | 5 |
| | sulfur | 2 |
| | zinc dimethyldithiocarbamate | 1.5 |
| | N,N'dibutylthiourea | 0.4 |
| | tellurium diethyldithiocarbamate | 0.4 |
| | filler - titanate-treated alumina trihydrate | Varied |

*Parts per 100 parts of polyphosphazene (phr)

Polymer was blended on a two-roll research mill with one roll at 120°–140° F. and the other at ambient conditions. Cup A was milled for 15 minutes to allow easier processing. The ingredients in Cup B were added to the polymer on the research mill. This was allowed to mix for an additional 15 minutes. The unexpanded blend was then precured in a press for one minute at a temperature of 220° F. and a pressure of 2000 psi. Pad thickness after pressing was ⅛ inch. The pad was then cured at 180° F. for 120 minutes. Finally, it was free expanded in a circulating air oven for 20 minutes at 250° F. and 20 minutes at 325° F.

The following examples illustrate the use of titanate-treated alumina trihydrate with polyphosphazenes containing unsaturation (e.g., the group W) in foams prepared using the recipe shown above. The poly-phosphazenes and treated fillers used are listed in the following table.

Table II[1]

| | | Examples 14 – 16 Filler | | Foam Properties | | | |
|---|---|---|---|---|---|---|---|
| | | | Titanate | Density | | NBS Flaming | |
| Example | Polyphosphazene | Parts | Treating Agent | lbs/ft.$^3$ | OI | Dm | SV/g |
| Comparative | [NP(OC$_6$H$_4$-4-OCH$_3$)$_{.97}$ (OC$_6$H$_4$-4-isoC$_3$H$_7$)$_{.97}$ (OC$_6$H$_4$-2-CH$_2$CH=CH$_2$)$_{.06}$]$_n$ | 125 | None | 11.9 | 42.8 | 252 | 30 |
| Comparative | " | 150 | None | 12.1 | 43.0 | — | — |
| 14 | [NP(OC$_6$H$_4$-4-OCH$_3$)$_{.97}$ (OC$_6$H$_4$-4-secC$_4$H$_9$)$_{.97}$ (OC$_6$H$_4$-2-CH$_2$CH=CH$_2$)$_{.06}$]$_n$ | 125 | ½% ETDOPP | 9.5 | — | 209 | 11 |
| 15 | [NP(OC$_6$H$_4$-4-OCH$_3$)$_{.97}$ (OC$_6$H$_4$-4-isoC$_3$H$_7$)$_{.97}$ (OC$_6$H$_4$-2-CH$_2$CH=CH$_2$)$_{.06}$]$_n$ | 125 | " | 7.1 | 42.5 | 226 | 20 |
| 16 | " | 150 | ½% TTS | 8.6 | — | 145 | 11 |

[1] See Table I for description of filler and definition of foam properties

FILMS

Filled, low-smoke polyphosphazene films were prepared by mill mixing followed by compression molding. The polyphosphazene was placed on a two-roll mill wth one roll at 120° – 140° F. and the other at ambient conditions. Filler material was then added and these ingredients were then milled 15 minutes to ensure homogenous mixing. The milled pad was then pressed for 30 seconds at a temperature of 200° F. and a pressure of 2000 psi to yield a 20 – 30 mil thick sheet. This was then allowed to cool and was cut to the required sizes for flame and smoke testing.

Table III[1]

| | | Examples 17 – 20 Filler | | | | | | | $\frac{F + N}{2}$ |
|---|---|---|---|---|---|---|---|---|---|
| | | | Titanate | | Flaming | | Nonflaming | | |
| Example | Polyphosphazene | Parts | Treating Agent | OI | Dm | SV/g | Dm | SV/g | Avg. |
| Comparative | [NP(OC$_6$H$_5$) (OC$_6$H$_4$-4-tC$_4$H$_9$)]$_m$ | 100 | None | 36.8 | 74 | 17 | 105 | 25 | 90 |
| 17 | " | 100 | 0.1% ETDOPP | 36.6 | 75 | 15 | 101 | 23 | 88 |

Table III[1]-continued

| | | Examples 17 - 20 | | | | | | |
|---|---|---|---|---|---|---|---|---|
| | | | Filler | | Flaming | | Nonflaming | | $\frac{F+N}{2}$ |
| Example | Polyphosphazene | Parts | Titanate Treating Agent | OI | Dm | SV/g | Dm | SV/g | Avg. |
| 18 | " | 100 | 0.5% ETDOPP | 36.5 | 73 | 14 | 94 | 21 | 84 |
| 19 | " | 100 | 2.0% ETDOPP | 36.0 | 64 | 15 | 158 | 33 | 111 |
| Comparative | [NP(OC$_6$H$_4$-4-OCH$_3$)$_{.96}$ (OC$_6$H$_4$-4-secC$_4$H$_9$)$_{.96}$ (OC$_6$H$_4$-2-OH$_2$CH=CH$_2$)$_{.08}$] | 100 | None | 36.1 | 68 | 11 | 47 | 9 | 58 |
| 20 | " | 100 | 0.5% ETDOPP | 35.7 | 56 | 10 | 38 | 7 | 47 |

[1]See Table I for description of treated fillers and identification of treating agents

What is claimed is:

1. A low-smoke polyphosphazene composition comprising 1 a. a phosphazene homopolymer or copolymer comprising repeating units of the formula

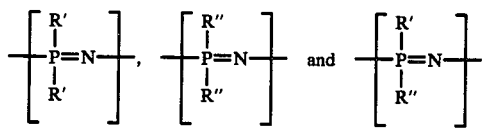

where R' and R" are the same or different and are halogen, amino, $C_1$ to $C_{10}$ dialkylamino, $C_1$ to $C_{10}$ alkylamino $C_6$ to $C_{14}$ arylamino, $C_6$ to $C_{14}$ diarylamino, $C_1$ to $C_{18}$ linear or branched alkyl, $C_2$ to $C_{18}$ linear or branched alkenyl, $C_1$ to $C_{18}$ alkoxy, $_6$ to $C_{14}$ aryl, $C_6$ to $C_{14}$ aryloxy, substituted $C_1$ to $C_{18}$ linear or branched alkenyl, substituted $C_1$ to $C_{18}$ alkoxy, substituted $C_6$ to $C_{14}$ aryl, or substituted $C_6$ to $C_{14}$ aryloxy, the substituents selected from the group consisting of halogen, nitro, cyano, alkoxy, aryloxy, alkenyl, amino, $C_1$ to $C_{10}$ alkylamino, $C_1$ to $C_{10}$ dialkylamino, $C_6$ to $C_{14}$ arylamino, $C_6$ to $C_{14}$ diarylamino, or mixtures thereof;

1 b. a mineral filler treated with an organo titanate of the formula

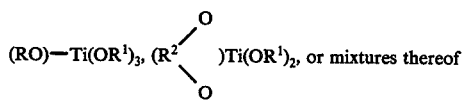

wherein $R^1$ is the radical —C(O)R$^3$, —P(O)(OR$^4$)$_2$, —P-(OR$^5$)$_2$, or —P(O)(OH)OP(OR$^6$)$_2$; R, R$^2$, R$^3$, R$^4$, R$^5$, and R$^6$ are the same or different and are $C_1$ to $C_{18}$ linear or branched alkyl, $C_2$ to $C_{18}$ linear, branched, or cycloalkylenyl, oxo-substituted $C_2$ to $C_{18}$ linear, branched, or cycloalkylenyl, $C_2$ to $C_{18}$ linear or branched alkenyl, $C_6$ to $C_{14}$ aryl and $C_6$ to $C_{14}$ substituted aryl, the substituents $C_1$ to $C_{18}$ linear or branched alkyl, $C_2$ to $C_{18}$ linear or branched alkenyl, halo, amino, $C_1$ to $C_8$ alkylamino or $C_1$ to $C_8$ dialkylamino.

2. The composition of claim 1 wherein R is different than R$^2$, R$^3$, R$^4$, R$^5$, and R$^6$ and is $C_1$ to $C_8$ linear or branched alkyl, $C_2$ to $C_8$ linear, branched, or cycloalkylenyl or oxo-substituted $C_2$ to $C_8$ linear or branched or cycloalkylenyl; R$^2$, R$^3$, R$^4$, R$^5$, and R$^6$ are the same or different and are $C_8$ $C_{18}$ linear or branched alkyl, $C_8$ to $C_{18}$ linear, branched or cycloalkylenyl, $C_8$ to $C_{18}$ linear or branched alkenyl, $C_6$ to $C_{14}$ substituted aryl, the substituents $C_8$ to $C_{18}$ linear or branched alkyl, $C_8$ to $C_{18}$ linear or branched alkenyl, chloro, $C_1$ to $C_4$ alkylamino or $C_1$ to $C_4$ dialkylamino; and R$^1$ is —C(O)R$^3$ or —P(O)-(OH)OP(OR$^6$)$_2$.

3. The composition of claim 2 wherein said organo titanate is isopropyl triisostearoyl titanate, isopropyl tri(dioctylphosphato) titanate, isopropyl tri(dioctylpyrophosphato) titanate, tetra (2,2 diallyloxymethyl-1-buteneoxy) titanium di(di-tridecyl) phosphite, titanium di(dioctylpyrophosphate) oxyacetate or di(dioctylphosphato) ethylene titanate.

4. The composition of claim 1 wherein said mineral filler has blended therewith 0.1% to 10% by weight of said organo titanate.

5. The composition of claim 4 wherein said mineral filler has blended therewith 0.2% to 5% by weight of said organo titanate.

6. The composition of claim 1 wherein said mineral fillers are non-fibrous and are limestone, whiting, clay, talc, silica, pumice, wood floor, or alumina trihydrate.

7. The composition of claim 6 wherein said mineral filler is of average particle size from about 0.5 microns to about 400 microns.

8. A poly(aryloxyphosphazene) smoke suppressed composition comprising a. an aryloxyphosphazene homopolymer or copolymer of the formula

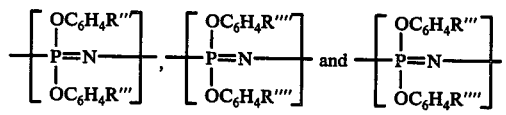

wherein R'" and R"" are the same or different and are hydrogen, a $C_1$-$C_{10}$ linear or branched alkyl radical or a $C_1$-$C_4$ linear or branched alkoxy radical, said R' and R" substituted in any sterically permissible position on the phenoxy group, and b. a mineral filler treated with an organo titanate of the formula

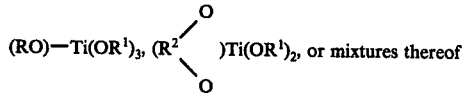

wherein $R^1$ is the radical —C(O)R$^3$, —P(O)(OR$^4$)$_2$, —P-(OR$^5$)$_2$, or —P(O)(OH)OP(OR$^6$)$_2$; R, R$^2$, R$^3$, R$^4$, R$^5$, and R$^6$ are the same or different and are $C_1$ to $C_{18}$ linear or branched alkyl, $C_2$ to $C_{18}$ linear, branched, or cycloalkylenyl, oxo-substituted $C_2$ to $C_{18}$ linear, branched, or cycloalkylenyl, $C_2$ to $C_{18}$ linear or branched alkenyl, $C_6$ to $C_{14}$ aryl and $C_6$ to $C_{14}$ substituted aryl, the substituents $C_1$ to $C_{18}$ linear or branched alkyl, $C_2$ to $C_{18}$ linear or branched alkenyl, halo, amino, $C_1$ to $C_8$ alkylamino or $C_1$ to $C_8$ dialkylamino.

9. The composition of claim 8 wherein R is different than R$^2$, R$^3$, R$^4$, R$^5$, and R$^6$ and is $C_1$ to $C_8$ linear or branched alkyl, $C_2$ to $C_8$ linear, branched, or cycloalkylenyl or oxo-substituted $C_2$ to $C_8$ linear or branched or cycloalkylenyl; $R^2$, $R^3$, $R^4$, $R^5$, and $R^6$ are the same or different and are $C_8$ to $C_{18}$ linear or branched alkyl, $C_8$ to $C_{18}$ linear, branched or cycloalkylenyl, $C_8$ to $C_{18}$ linear or branched alkenyl, $C_6$ to $C_{14}$ substituted aryl, the substituents $C_8$ to $C_{18}$ linear or branched alkyl, $C_8$ to $C_{18}$ linear or branched alkenyl, chloro, $C_1$ to $C_4$ alkylamino or $C_1$ or $C_4$ dialkylamino; and $R^1$ is $-C(O)R^3$ or $-P(O)(OH)OP(OR^6)_2$.

10. The composition of claim 8 wherein the organo titanate is isopropyl triisostearoyl titanate, isopropyl tri(dioctylphosphato) titanate, isopropyl tri(dioctylpyrophosphato) titanate, tetra (2,2 diallkyloxymethyl-1-buteneoxy) titanium di(di-tridecyl) phosphite, titanium di(dioctylpyrophosphate) oxyacetate or di(dioctylphosphato) ethylene titanate.

11. The composition of claim 8 wherein said mineral filler has blended therewith 0.1% to 10% by weight of said organo titanate.

12. The composition of claim 8 wherein said mineral filler has blended therewith 0.2% to 5% by weight of said organo titanate.

13. The composition of claim 8 wherein said mineral fillers are non-fibrous and are limestone, whiting, clay, talc, silica, pumice, wood floor, or alumina trihydrate.

14. The composition of claim 8 wherein said mineral filler is of average particle size from about 0.5 microns to about 400 microns.

15. The poly(aryloxyphosphazene) composition of claim 8 wherein said aryloxyphosphazene homocopolymer or copolymer has randomly repeating units represented by the formula

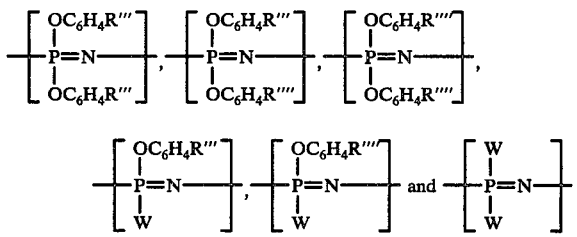

wherein R''' and R'''' are the same as before and W is a monovalent radical containing a group capable of crosslinking said group being attached to the phosphorous of the $-P=N-$ radical by an $-O-$ linkage.

16. The process of curing the composition of claim 15 which comprises heating said copolymers at a temperature of from 200°–350° F., utilizing a sulfur-type curing agent.

17. The composition of claim 15 cured with a sulfur-type curing agent.

18. The process of curing the composition of claim 14 which comprises heating said composition at a temperature of from 200°–350° F., utilizing peroxide-type curing agents.

19. The composition of claim 14 cured with a peroxide curing agent.

20. The process of curing the composition of claim 15 which comprises heating said composition at a temperature of from 200°–350° F., utilizing peroxide-type curing agents.

21. The composition of claim 15 cured with a peroxide curing agent.

22. The process of foaming the composition of claim 1 which comprising mixing said composition with a chemical blowing agent and heating the mixture to a temperature sufficient to decompose said blowing agent.

23. The process of claim 22 wherein said blowing agent is 1,1'-bisazoformamide.

24. The process of foaming the composition of claim 14 which comprises mixing said composition with a chemical blowing agent and heating the mixture to a temperature sufficient to decompose said blowing agent.

25. The process of foaming the composition of claim 15 which comprises mixing said composition with a chemical blowing agent and heating the mixture to a temperature sufficient to decompose said blowing agent.

26. A foamed low-smoke polyphosphazene composition comprising
a. a phosphazene homopolymer or copolymer comprising repeating units of the formula

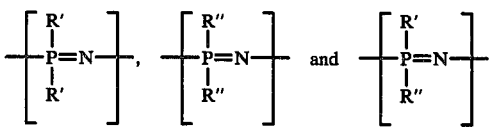

where R' and R'' are the same or different and are halogen, amino, $C_1$ to $C_{10}$ dialkylamino, $C_1$ to $C_{10}$ alkylamino, $C_6$ to $C_{14}$ arylamino, $C_6$ to $C_{14}$ diarylamino, $C_1$ to $C_{18}$ linear or branched alkyl, $C_2$ to $C_{18}$ linear or branched alkenyl, $C_1$ to $C_{18}$ alkoxy, $C_6$ to $C_{14}$ aryl, $C_6$ to $C_{14}$ arloxy, substituted $C_1$ to $C_{18}$ linear or branched alkyl, substituted $C_2$ to $C_{18}$ linear or branched alkenyl, substituted $C_1$ to $C_{18}$ alkoxy, substituted $C_6$ to $C_{14}$ aryl, or substituted $C_6$ to $C_{14}$ arloxy, the substituents selected from the group consisting of halogen, nitro, cyano, alkoxy, aryloxy, alkenyl, amino, $C_1$ to $C_{10}$ alkylamino, $C_1$ to $C_{10}$ dialkylamino, $C_6$ to $C_{14}$ arylamino, $C_6$ to $C_{14}$ diarylamino, or mixtures thereof;
b. a mineral filler treated with an organo titanate of the formula

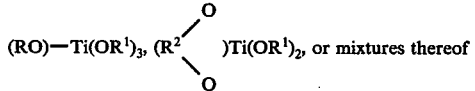

wherein $R^1$ is the radical $-C(O)R^3$, $-P(O)(OR^4)_2$, $-P(OR^5)_2$, or $-P(O)(OH)OP(OR^6)_2$; R, $R^2$, $R^3$, $R^4$, $R^5$, and $R^6$ are the same or different and are $C_1$ to $C_{18}$ linear or branched alkyl, $C_2$ to $C_{18}$ linear, branched, or cycloalkylenyl, oxo-substituted $C_2$ to $C_{18}$ linear, branched, or cycloalkylenyl, $C_2$ to $C_{18}$ linear or branched alkenyl, $C_6$ to $C_{14}$ aryl and $C_6$ to $C_{14}$ substituted aryl, the substituents $C_1$ to $C_{18}$ linear or branched alkyl, $C_2$ to $C_{18}$ linear or branched alkenyl, halo, amino, $C_1$ to $C_8$ alkylamino or $C_1$ to $C_8$ dialkylamino.

27. The composition of claim 26 wherein R is different than $R^2$, $R^3$, $R^4$, $R^5$, and $R^6$ and is $C_1$ to $C_8$ linear or branched alkyl, $C_2$ to $C_8$ linear, branched, or cycloalkylenyl or oxo-substituted $C_2$ to $C_8$ linear or branched or cycloalkylenyl; $R^2$, $R^3$, $R^4$, $R^5$, and $R^6$ are the same or different and are $C_8$ to $C_{18}$ linear or branched alkyl, $C_8$ to $C_{18}$ linear, branched, or cycloalkylenyl, $C_8$ to $C_{18}$ linear or branched alkenyl, $C_6$ to $C_{14}$ substituted aryl, the substituents $C_8$ to $C_{18}$ linear or branched alkyl, $C_8$ to $C_{18}$ linear or branched alkenyl, chloro, $C_1$ to $C_4$ alkylamino or $C_1$ to $C_4$ dialkylamino; and $R^1$ is —C(O)$R^3$ or —P(O)(OH)OP(O$R^6$)$_2$.

28. The composition of claim 27 wherein said organo titanate is isopropyl triisostearoyl titanate, isopropyl tri(dioctylphosphato) titanate, isopropyl tri(dioctylpyrophosphato) titanate, tetra (2,2 diallyloxymethyl-1-buteneoxy) titanium di(di-tridecyl) phosphite, titanium di(dioctylpyrophosphate) oxyacetate or di(dioctylphosphato) ethylene titanate.

29. The composition of claim 26 wherein said mineral filler had blended therewith 0.1% to 10% by weight of said organo titanate.

30. The composition of claim 29 wherein said mineral filler has blended therewith 0.2% to 5% by weight of said organo titanate.

31. The composition of claim 26 wherein said mineral fillers are non-fibrous and are limestone, whiting, clay, talc, silica, pumice, wood floor, or alumina trihydrate.

32. The composition of claim 31 wherein said mineral filler is of average particle size from about 0.5 microns to about 400 microns.

33. A poly(aryloxyphosphazene) smoke suppressed composition comprising a. an aryloxyphosphazene homopolymer or copolymer of the formula

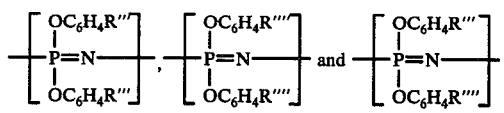

wherein R''' and R'''' are the same or different and are hydrogen, a $C_1$–$C_{10}$ linear or branched alkyl radical or a $C_1$–$C_4$ linear or branched alkoxy radical, said R''' and R'''' substituted in any sterically permissible position on the phenoxy group, and b. a mineral filler treated with an organo titanate of the formula

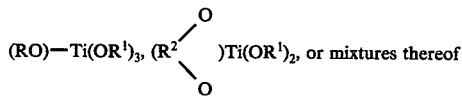

wherein $R^1$ is the radical —C(O)$R^2$, —P(O)(O$R^4$)$_2$, —P(O$R^5$)$_2$, or —P(O)(OH)OP(O$R^6$)$_2$; R, $R^2$, $R^3$, $R^4$, $R^5$, and $R^6$ are the same or different and are $C_1$ to $C_{18}$ linear or branched alkyl, $C_2$ to $C_{18}$ linear, branched, or cycloalkylenyl, oxo-substituted $C_2$ to $C_{18}$ linear, branched, or cycloalkylenyl, $C_2$ to $C_{18}$ linear or branched alkenyl, $C_6$ to $C_{14}$ aryl and $C_6$ to $C_{14}$ substituted aryl, the substituents $C_1$ to $C_{18}$ linear or branched alkyl, $C_2$ to $C_{18}$ linear or branched alkenyl, halo, amino, $C_1$ to $C_8$ alkylamino or $C_1$ to $C_8$ dialkylamino.

34. The composition of claim 33 wherein R is different than $R^2$, $R^3$, $R^4$, $R^5$, and $R^6$ and is $C_1$ to $C_8$ linear or branched alkyl, $C_2$ to $C_8$ linear, branched, or cycloalkylenyl or oxo-substituted $C_2$ to $C_8$ linear or branched or cycloalkylenyl; $R^2$, $R^3$, $R^4$, $R^5$, and $R^6$ are the same or different and are $C_8$ to $C_{18}$ linear or branched alkyl, $C_8$ to $C_{18}$ linear, branched, or cycloalkylenyl, $C_8$ to $C_{18}$ linear or branched alkenyl, $C_6$ to $C_{14}$ substituted aryl, the substituents $C_8$ to $C_{18}$ linear or branched alkyl, $C_8$ to $C_{18}$ linear or branched alkenyl, chloro, $C_1$ to $C_4$ alkylamino or $C_1$ to $C_4$ dialkylamino; and $R^1$ is —C(O)$R^3$ or —P(O)(OH)OP(O$R^6$)$_2$.

35. The composition of claim 33 wherein said organo titanate is isopropyl triisostearoyl titanate, isopropyl tri(dioctylphosphato) titanate, isopropyl tri(dioctylpyrophosphato) titanate, tetra (2,2 diallyloxymethyl-1-buteneoxy) titanium di(di-tridecyl) phosphite, titanium di(dioctylpyrophosphate) oxyacetate or di(dioctylphosphato) ethylene titanate.

36. The composition of claim 33 wherein said mineral filler has blended therewith 0.1% to 10% by weight of said organo titanate.

37. The composition of claim 33 wherein said mineral filler has blended therewith 0.2% to 5% by weight of said organo titanate.

38. The composition of claim 33 wherein said mineral fillers are non-fibrous and are limestones, whiting, clay, talc, silica, pumice, wood floor, or alumina trihydrate.

39. The composition of claim 33 wherein said mineral filler is of average particle size from about 0.5 microns to about 400 microns.

40. The poly(aryloxyphosphazene) composition of claim 33 wherein said aryloxyphosphazene homopolymer or copolymer has randomly repeating units represented by the formula

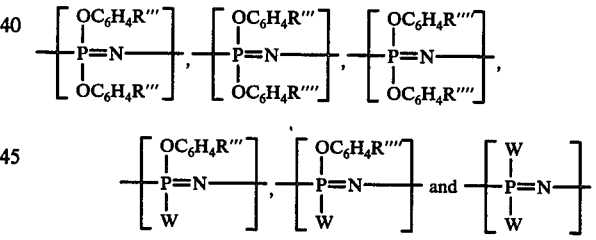

wherein R''' and R'''' are the same as before and W is a monovalent radical containing a group capable of crosslinking said group being attached to the phosphorous of the —P=N— radical by an —O— linkage.

* * * * *

UNITED STATES PATENT AND TRADEMARK OFFICE
CERTIFICATE OF CORRECTION

PATENT NO. : 4,083,820
DATED : April 11, 1978
INVENTOR(S) : Ronald L. Dieck et al It is certified that error appears in the above-identified patent and that said Letters Patent are hereby corrected as shown below:

In the Specification:

Column 1, line 27, the words "U.s." should read --U.S.--; same column, lines 34 and 35, the words "latter-mentioneed" should read --latter-mentioned--; same column, line 47, the word "rangee" should read --range--. Column 3, line 7, "di(12-formylphenoxyl)titanium" should read --di(2-formylphenoxyl)titanium--. Column 5, line 12, that portion of the formula which reads "$(OC_6H_4R''')_b]_n$" should read --$(OC_6H_4R''')_b]_n$--. Column 6, line 47, "$R''' \quad R''''$" should read --$R''' \neq R''''$--. Columns 9 and 10, under Table I, the heading "Flaming" should read --Flaming$^4$--.

In the Claims:

Claim 1, column 13, line 31, after the word "branched" the words --alkyl, $C_2$ to $C_{18}$ linear or branched-- have been omitted. Claim 2, column 13, line 62, "$C_8C_{18}$" should read --$C_8$ to $C_{18}$--. Claim 22, column 15, line 68, the word "comprising" should read --comprises--. Claim 29, column 17, line 11, the word "had" should read --has--. Claim 33, column 17, line 47, that portion of the formula which reads "-$C(O)R^2$" should read ---$C(O)R^3$--.

Signed and Sealed this

Fifth Day of September 1978

[SEAL]

Attest:

RUTH C. MASON
*Attesting Officer*

DONALD W. BANNER
*Commissioner of Patents and Trademarks*